United States Patent
Wu

(10) Patent No.: US 8,125,954 B2
(45) Date of Patent: Feb. 28, 2012

(54) SYSTEM FOR FA RELOCATION WITH CONTEXT TRANSFER IN WIRELESS NETWORKS

(75) Inventor: Yingzhe Wu, San Marcos, CA (US)

(73) Assignee: FutureWei Technologies, Inc., Plano, TX (US)

(*) Notice: Subject to any disclaimer, the term of this patent is extended or adjusted under 35 U.S.C. 154(b) by 1285 days.

(21) Appl. No.: 11/744,664

(22) Filed: May 4, 2007

(65) Prior Publication Data

US 2008/0273496 A1    Nov. 6, 2008

(51) Int. Cl.
   *H04W 4/00* (2009.01)
(52) U.S. Cl. ............ 370/331; 370/328; 370/395.4; 370/389; 370/351; 370/352; 455/436; 455/438; 455/39; 455/432.2; 455/432.1; 709/203; 709/223; 709/226; 709/227; 709/228; 709/230; 709/245
(58) Field of Classification Search ............. 455/435.1, 455/435.2, 436–444, 432.1, 432.2; 370/328, 370/329, 330, 331, 338, 351, 352, 389, 395.4, 370/401, 431, 356, 385.4; 709/203, 223, 709/225, 226, 227, 228, 229, 230, 245, 218
See application file for complete search history.

(56) References Cited

U.S. PATENT DOCUMENTS

| | | | |
|---|---|---|---|
| 6,195,705 B1* | 2/2001 | Leung | 709/245 |
| 6,438,370 B1* | 8/2002 | Einola et al. | 455/422.1 |
| 6,473,413 B1* | 10/2002 | Chiou et al. | 370/331 |
| 6,771,623 B2* | 8/2004 | Ton | 370/331 |
| 6,795,857 B1* | 9/2004 | Leung et al. | 709/224 |
| 6,909,895 B2* | 6/2005 | Einola et al. | 455/423 |
| 6,928,284 B2* | 8/2005 | Palat et al. | 455/436 |
| 6,973,311 B2* | 12/2005 | Yi-Bing et al. | 455/436 |
| 7,242,932 B2* | 7/2007 | Wheeler et al. | 455/435.1 |
| 7,272,123 B2* | 9/2007 | Wall | 370/331 |
| 7,359,347 B2* | 4/2008 | Ahmavaara et al. | 370/328 |
| 7,369,522 B1* | 5/2008 | Soininen et al. | 370/328 |
| 7,443,835 B2* | 10/2008 | Lakshmi Narayanan et al. | 370/352 |
| 7,539,164 B2* | 5/2009 | Maenpaa et al. | 370/331 |
| 7,577,119 B2* | 8/2009 | Yokota et al. | 370/331 |
| 7,664,503 B2* | 2/2010 | Choi et al. | 455/445 |
| 7,676,223 B2* | 3/2010 | Das et al. | 455/422.1 |
| 2003/0073439 A1* | 4/2003 | Wenzel et al. | 455/435 |

(Continued)

FOREIGN PATENT DOCUMENTS

CN    1596023 A    3/2005

(Continued)

OTHER PUBLICATIONS

PCT International Search Report and PCT Written Opinion of the International Searching Authority for PCT/CN2008/070550, forms PCT/ISA/220, PCT/ISA/210 and PCT/ISA/237, mailed Jul. 3, 2008, Applicant: Huawei Technologies Co., Ltd., et al., 14 pages.

*Primary Examiner* — Olumide T Ajibade Akonai
(74) *Attorney, Agent, or Firm* — Slater & Matsil, L.L.P.

(57) ABSTRACT

A system for foreign agent relocation in a wireless network. The system comprises at least one first foreign agent; at least one second foreign agent; and at least one mobile node. Relocation negotiation is performed to determine whether foreign agent relocation of the mobile node from the at least one first foreign agent to the at least one second foreign agent is agreed, and foreign agent relocation is performed if the foreign agent relocation is agreed.

34 Claims, 5 Drawing Sheets

U.S. PATENT DOCUMENTS

| | | | |
|---|---|---|---|
| 2003/0139182 A1* | 7/2003 | Bakkeby et al. | 455/432 |
| 2006/0183472 A1* | 8/2006 | Nookala et al. | 455/426.1 |
| 2006/0233141 A1 | 10/2006 | Iyer et al. | |
| 2007/0014262 A1* | 1/2007 | Gras et al. | 370/331 |
| 2007/0213058 A1* | 9/2007 | Shaheen | 455/436 |
| 2007/0254661 A1* | 11/2007 | Chowdhury et al. | 455/436 |
| 2007/0291695 A1* | 12/2007 | Sammour et al. | 370/331 |

FOREIGN PATENT DOCUMENTS

| | | |
|---|---|---|
| EP | 1679851 A1 * | 7/2006 |
| WO | WO 02/35738 A1 | 5/2002 |
| WO | WO 03/073723 A2 | 9/2003 |

* cited by examiner

SYSTEM FOR FA RELOCATION WITH CONTEXT TRANSFER IN WIRELESS NETWORKS

TECHNICAL FIELD OF THE INVENTION

The present invention relates generally to wireless communications, and more particularly, to a versatile system for foreign agent relocation with context transfer in wireless networks.

BACKGROUND OF THE INVENTION

With rapid development and growing ubiquity of wireless communication services, user expectations for the quality of wireless communication devices and networks increase. Correspondingly, an array of increasingly more sophisticated wireless communication systems and standards are developed and implemented.

The IEEE 802.16 standard and its constituent branches comprise one such standard. "WiMAX" is a term that is commonly used to refer to standard, interoperable implementations of IEEE 802.16 wireless systems and sub-systems. The bandwidth and physical range of WiMAX make it a suitable technology for a number of wireless applications, such as: connectivity for Wi-Fi hotspots; providing wireless "last mile" (or "last km") broadband access; and providing high-speed mobile data and telecommunications services.

WiMAX designs a Proxy Mobile Internet Protocol (PMIP), which is a network entity called PMIP client with Mobile Internet Protocol (MIP) capabilities. The PMIP client will conduct Mobile IP operation on behalf of a Mobile Station (MS).

However, conventional Foreign Agent (FA) relocation methods present many problems. For example, Layer3 context, such as Quality of Service information, Accounting information, Service Flow (SF) information, and Dynamic Host Configuration Protocol (DHCP) proxy information maintained by Anchor Data Path Function (DPF), may be transferred from source to target during Layer2 handover phase, but this presents a problem if same context are maintained in two different places before FA is actually relocated; certain amount of node processing (at PMIP client) and network bandwidth or traffic may be wasted if a target FA refuses the relocation for some reason; and the conventional FA relocation procedure is not secure, since any network node may tell the PMIP client to register with a different FA, hence redirecting mobile traffic to somewhere else.

Therefore, there is a need to provide a system and method for foreign agent relocation that is secure, reliable and efficient.

SUMMARY OF THE INVENTION

A system, comprising various of methods and constructs, for foreign agent relocation in a wireless network is provided. The system comprises at least one first foreign agent; at least one second foreign agent; and at least one mobile node. Relocation negotiation is performed to determine whether foreign agent relocation of the mobile node from the at least one first foreign agent to the at least one second foreign agent is agreed, and foreign agent relocation is performed if the foreign agent relocation is agreed.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The following terms are used in the description of the present invention below:

Access Service Network (ASN): Access Service Network (ASN) is defined as a set of network functions that provide radio access to a mobile station.

Base Station (BS): A generalized equipment set providing connectivity, management, and control of a subscriber station.

Connectivity Service Network (CSN): Connectivity Service Network (CSN) is defined as a set of network functions that provide IP connectivity services to a mobile station which has IP connectivity capability.

Mobile Station (MS): A station in the mobile service intended to be used while in motion or during halts at unspecified points.

Home Agent (HA): A router on a mobile node's home network which tunnels datagram for delivery to the mobile node when it is away from home, and maintains current location information for the mobile node.

Foreign Agent (FA): A router on a visited network which tunnels datagram for delivery to a mobile node when it is away from home, and maintains tunneling information for the mobile node.

Figure 1:
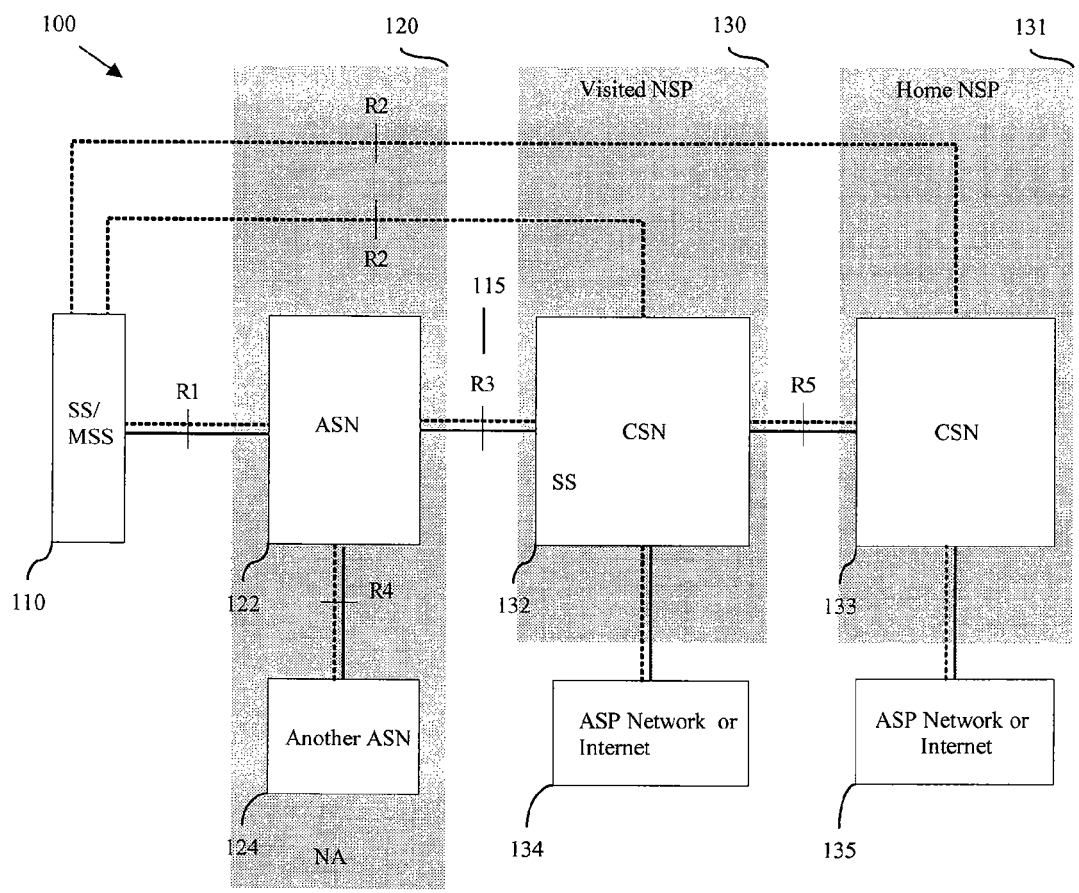
FIG. 1 illustrates architecture of a WiMAX network.

FIG. 1 is a WiMAX network (100) architecture depicting a Reference Point R3 (115) between an Access Service Network (ASN) (122) and a Connectivity Service Network (CSN) (132). WiMAX network (100) includes a plurality of internetworking components, and these components further include a Mobile/Fixed Subscriber Station (SS/MSS) (110), a Network Access Provider (NAP) (120), a Visited Network Service Provider (Visited NSP) (130), and a Home NSP (131). NAP (120) includes a plurality of Access Service Networks (ASN), e.g., ASN (122) and ASN (124). ASN (122) or ASN (124) represents a boundary for functional interoperability with WiMAX clients, WiMAX connectivity service functions and aggregation of functions embodied by different vendors. ASN (122) or ASN (124) defines a logical boundary and represents a convenient way to describe aggregation of functional entities and corresponding message flows associated with access services.

Visited NSP (130) includes a Connectivity Service Network (CSN) (132), and an Application Service Provider (ASP) Network or Internet (134); and Home NSP (131) includes a CSN (133) and an ASP Network or Internet (135). A CSN, for example CSN (133), is defined as a set of network functions that provide IP connectivity services to WiMAX subscribers. CSN (133) may comprise network elements such as routers, AAA proxy/servers, user databases, and interworking gateway devices.

The architecture of Network (100) is based on the IEEE802.16d/e wireless standard. In addition, ASN (122) and CSN (132) are interconnected via Reference Point R3 (115). The IEEE802.16e standard describes Reference Point R3 (115) as an interface between ASN (122) and CSN (132) that carries control information and IP packets. Reference Point R3 (115) includes a set of control plane protocols that support network Authentication, Authorization, and Accounting (AAA), policy enforcement and mobility management capabilities. Furthermore, Reference Point R3 (115) encompasses bearer plane methods, including tunneling, to transfer IP data between ASN (122) and CSN (132).

In Mobile IP environment, the R3 data path establishment equals the Mobile Internet Protocol (MIP) session establishment. In order to realize Mobile Station (MS) global roaming without changing an MS's IP address, MIP protocol is introduced by Internet Engineering Task Force (IETF). An MS with MIP capability may roam into different network without losing its original IP address, which is assigned while it registers to a network. But there are still many MSs that don't and will not have MIP capability. In order to make those MSs have the same mobility performance as the MS with MIP capability, WiMAX design a Proxy MIP (PMIP) protocol, which is a network entity called PMIP client with MIP capability, and conducts Mobile IP operation on behalf of the MS.

Figure 2:
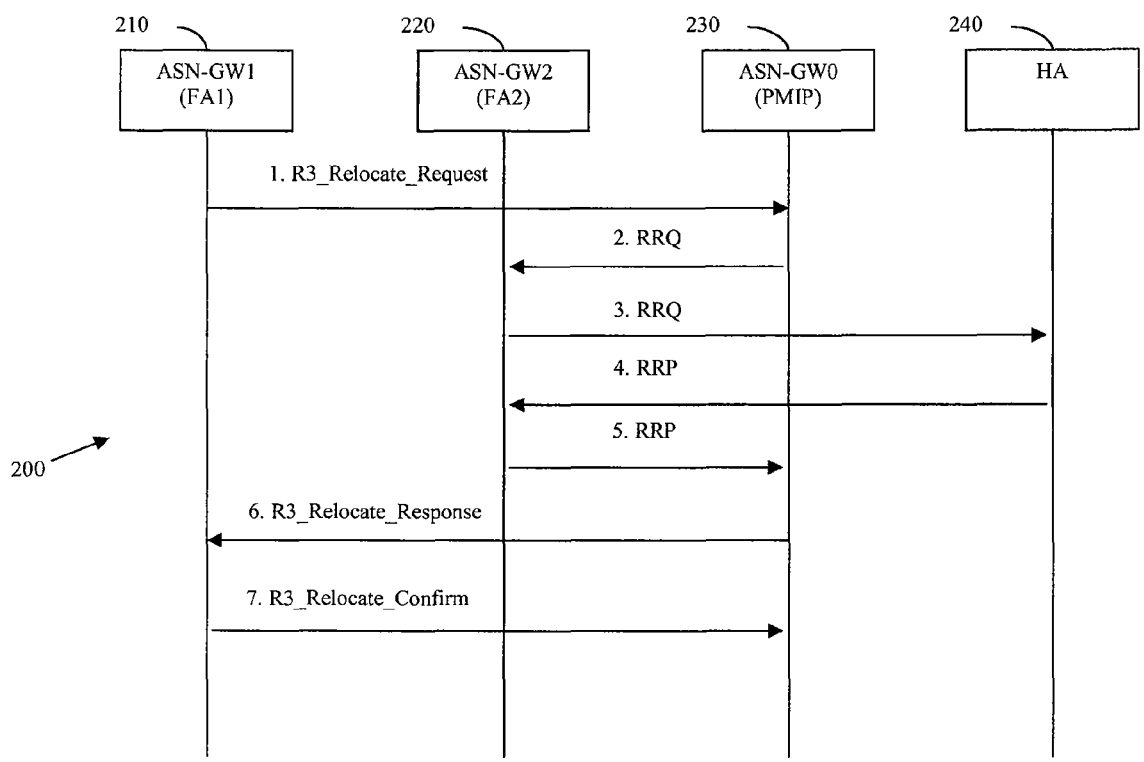
FIG. 2 illustrates a sequence diagram of FA relocation initiated by source.

Referring now to FIG. 2, a diagram (200) illustrating conventional sequences of Foreign Agent (FA) relocation initiated by a source Access Service Network—Gateway (ASN-GW) or an FA. A source foreign agent FA1 (210) wants to relocate FA functionality to a target foreign agent FA2 (220), and initiates relocation procedure. In the first step, source foreign agent FA1 (210) sends a R3_Relocate_Request to a PMIP client (230), initiating FA relocation. In step 2, PMIP client (230) sends a RRQ message to target foreign agent FA2 (220). FA2 (220) relays the RRQ to a Home Agent (HA) (240) in step 3, and HA (240) responds with a RRP message in step 4. In step 5, target FA2 (220) responds PMIP client (230) with a RRP message. PMIP client (230) then sends a R3_Relocate_Respnse message to FA1 (210) in step 6, and FA1 (210) responds with a R3_Relocate_Confirm message in step 7.

Figure 3:
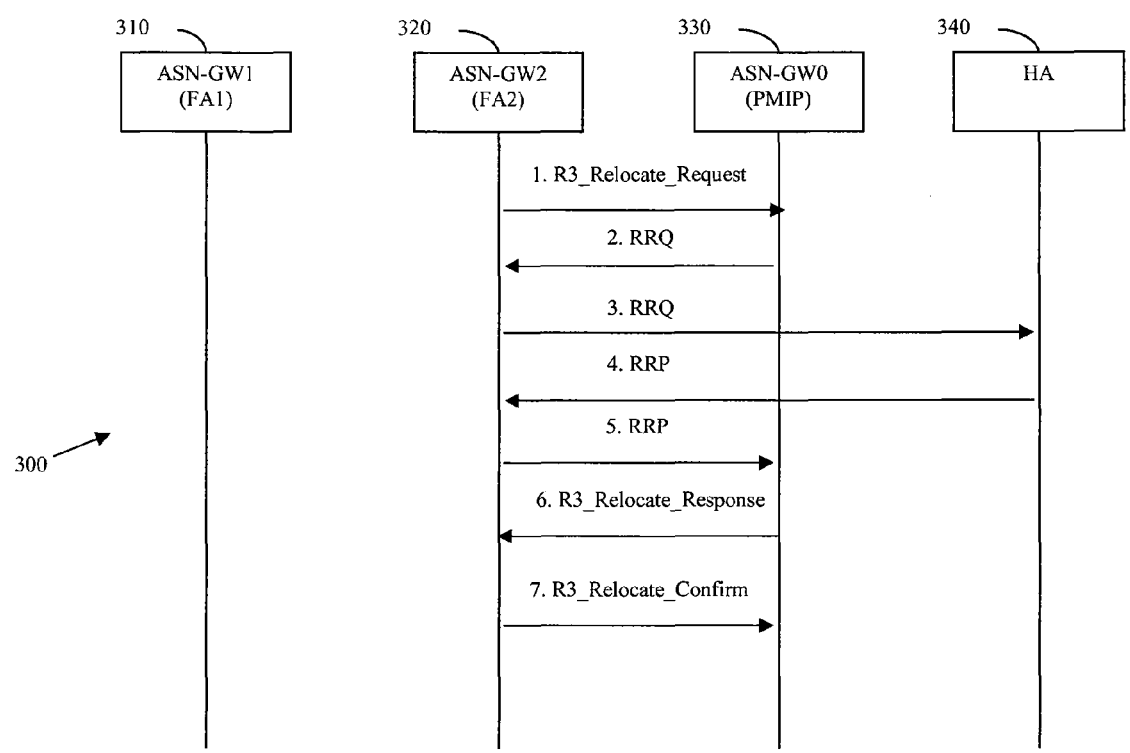
FIG. 3 illustrates a sequence diagram of FA relocation initiated by target.

FIG. 3 is a diagram (300) illustrating conventional sequences of FA relocation initiated by target. A target foreign agent FA2 (320) wants to take over FA functionality from a source foreign agent FA1 (310), and initiates relocation procedure. In the first step, FA2 (320) sends a R3_Relocate_Request to a Proxy Mobile IP (PMIP) client (330), initiating FA relocation. In step 2, PMIP client (330) sends a RRQ message to FA2 (320). FA2 (320) relays the RRQ to Home Agent (HA) (340) in step 3, and HA (340) responds with a RRP message in step 4. In step 5, FA2 (320) responds PMIP client (330) with a RRP message. PMIP client (330) then sends a R3_Relocate_Respnse message to FA2 (320) in step 6, and FA2 (320) responds with a R3_Relocate_Confirm message in step 7. In this instance, source foreign agent FA1 (310) has no participation in the relocation procedure.

The conventionally Foreign Agent (FA) relocation in WiMAX presents many error cases and security holes. For example, it is unclear when the Layer3 context, such as Quality of Service (Qos) information, Accounting information, Connectivity Service Network Mobility Management (CS-NMM) information, Service Flow (SF) information and Dynamic Host Configuration Protocol (DHCP) proxy information maintained by an Anchor Data Path Function (DPF), is transferred from source to target. This context may be transferred during a Layer2 Handover (HO) phase, or may be communicated using R3 relocation messages (only for source initiated relocation sequences).

If context is transferred during the handover phase, there is a problem with dynamically changed context information—such as DHCP context, SF, QoS, or accounting information—any change to this context before actual FA relocation will have to be communicated to target again; another problem is that bandwidth is wasted and information is flooded to FAs that do no need to know this information, because most probably, a serving ASN-GW or an FA may not become the target FA.

If context transferred during R3 relocation phase, there is an unnecessary detour to a PMIP client, which does not need to know this information.

Furthermore, in the conventional FA relocation methods, an FA may initiate FA relocation, but may not know for sure whether the FA relocation will be agreed or rejected. As a result, for source initiated relocation, certain amount of node processing (at the PMIP client) and network bandwidth or traffic may be wasted if a target FA refuses the relocation for some reason. For target initiated sequence, bad relocation behavior may be resulted in, such as ping-pong, frequent relocation due to mobility movement, because source has no participation in the relocation procedure; situation may get also worse if soft handoff is supported in later release, when multiple targets may initiate relocation sequence at about the same time, which none of them may be the optimal target; and any network node may tell the PMIP client to register with a different FA, thus traffic may be redirected due to malicious target or misbehaving target. Therefore, the conventional relocation is not secure.

In addition, the MIP registration messages RRQ/RRP are directly sent between the PMIP client and an FA. This violates the requirements in mobile IP, which assume the MIP signaling and mobile traffic are originated and terminated on the same mobile node.

Comparatively, the present invention provides an FA relocation negotiation mechanism before actual relocation. The mechanism determines whether FA relocation between a source FA and a target FA is agreed or rejected. If the FA relocation is agreed, then relocation is performed.

In one embodiment, the FA relocation negotiation may be performed between a Source (Anchor) ASN-GW (or an FA) and a Target (Serving) ASN-GW (or an FA), and may involves initiation of an FA relocation request at one end, and acceptance or rejection of the relocation request on the other end. Therefore, when a source FA would like a target FA to take over FA functionality of a mobile node, the source FA may negotiate with the target FA, e.g., by sending a relocation request to the target FA, whether the target FA agrees with the relocation. If the target FA rejects, then the source FA may not continue the relocation; if the target FA agrees, relocation may be performed. The same negotiation mechanism applies when a target FA would like to take over FA functionality of a mobile node from a source FA. The target FA may initiate negotiation with the source FA. If the source FA agrees, then FA relocation is performed. Acceptance or rejection of FA relocation may be determined using local conditions of the FA receiving relocation request.

DHCP context and other Layer3 context may be transferred during the negotiation. For example, in case of FA relocation initiated by a source FA, the Layer3 context may be transferred together with an FA relocation request to a target FA, regardless whether or not the target FA may agree or reject the relocation; In case of FA relocation initiated by a target FA, the Layer3 context may be transferred from a source FA to the target FA after the source FA agrees with the relocation.

If the FA relocation from a source to a target FA (or ASN-GW) is agreed, only the target may need to talk to a PMIP Client in Authenticating the target FA (or ASN-GW) to initiate MIP registration. MIP registration request or response messages, i.e., RRQ or RRP messages, may be encapsulated in WIMAX control messages, and the target FA may obtain source (current) FA-CoA (Care-of Address) during the negotiation as an approval to the PMIP client for MIP registration. If registration of the target FA (or target ASN-GW) fails for some reasons, for example, because of network congestion between the target FA and an HA of an MS, or invalid security association between the target FA and the HA, the current FA (source FA) may continue to operate and provide services to the MS.

By adopting the mechanism in the present invention, a concise and more secured FA relocation procedure may be provided, all the problems identified earlier may be resolved, and a solid FA relocation framework and associated context transfer may be obtained.

The negotiation mechanism in the present invention may be applied to FA relocation in WiMAX networks, or other wireless networks providing FA relocation similar to a WiMAX network without departing the spirit and scope of the present invention.

Figure 4:
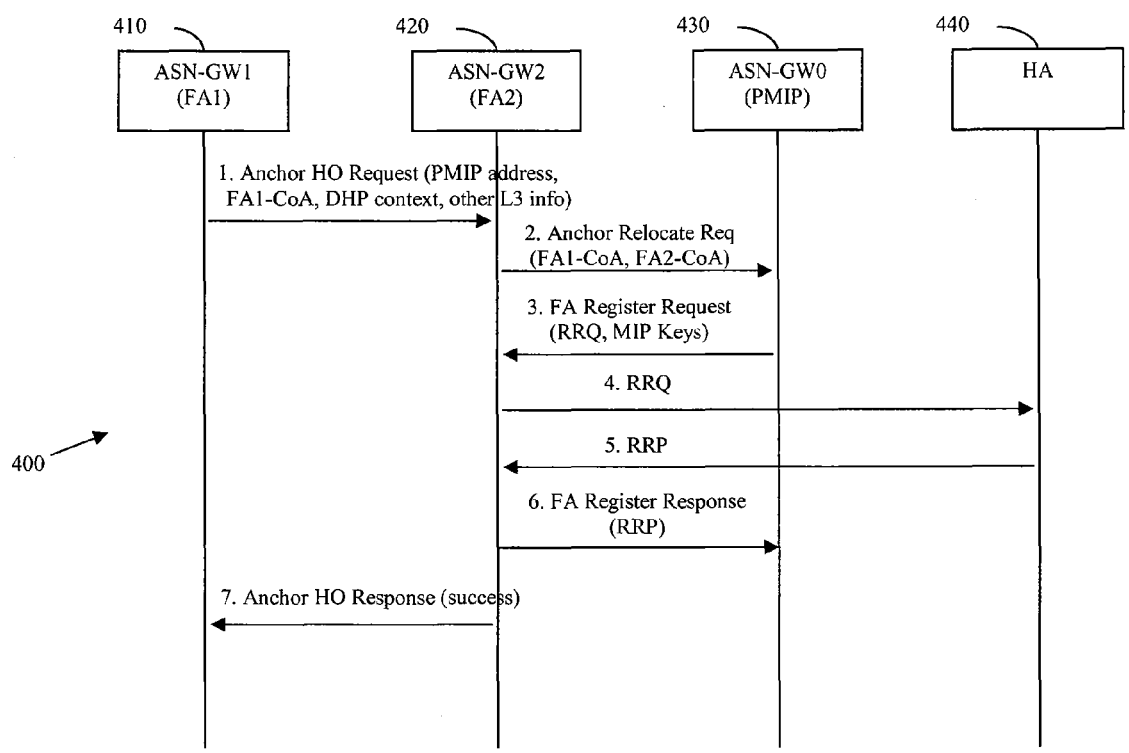
FIG. 4 illustrates a sequence diagram of FA relocation initiated by source according to one embodiment of the present invention.

Referring now to FIG. 4, a diagram (400) illustrating sequences of FA relocation initiated by a source FA or ASN-GW according to one embodiment of the present invention. A source foreign agent FA1 (ASN-GW1) (410) initiates FA relocation, and sends a FA relocation request to a target foreign agent FA2 (ASN-GW2) (420) for relocation negotiation. In step 1, FA1 (410) may decide based on its measurement that it wants a target to handle the FA functionality, and it sends over PMIP address, its own Care of Address (CoA), Dynamic Host Configuration Protocol (DHCP) context and other Layer3 information to target FA2 (420) in an Anchor HO Request message. In step 2, if FA2 (420) agrees to take over based on its own measurement, it initiates FA relocation with a PMIP Client (430) by sending FA1-CoA and its own CoA in an Anchor Relocate Request. In Steps 3, 4, 5, and 6, PMIP Client (430) verifies that FA1-CoA is the current FA using its record, and starts MIP registration by sending RRQ and MIP keys to FA2 (420). In step 7, FA2 (420) informs the FA1 (410) of successful relocation in an Anchor HO Response message. FA1 (410) may then remove DHCP context, MIP binding and other Layer3 information.

Figure 5:
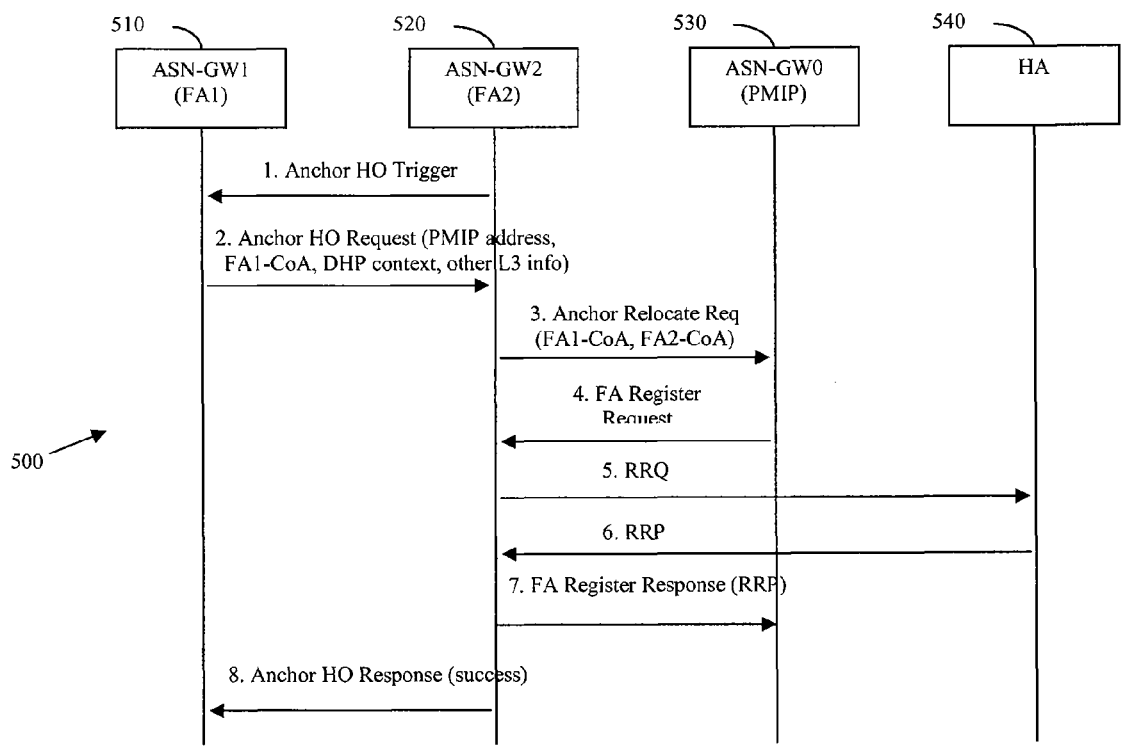
FIG. 5 illustrates a sequence diagram of FA relocation initiated by target according to another embodiment of the present invention.

Referring now to FIG. 5, a diagram (500) illustrating sequences of FA relocation initiated by a target FA or ASN-GW according to another embodiment of the present invention. A target foreign agent FA2 (ASN-GW2) (520) initiates FA relocation, and sends an FA relocation trigger to a source foreign agent FA1 (ASN-GW1) (510) for relocation negotiation. In step 1, a target FA2 (520) initiates the FA relocation negotiation, and sends an Anchor HO Trigger message to an anchor DPF in source FA1 (510). If FA1 (510) agrees with the FA relocation, FA1 (510) proceeds to step 2. If the source FA1 (510) initiates the FA relocation procedure, the call flow starts from step 2.

In step 2, FA1 (510) verifies that the trigger does come from an FA or ASN-GW in down stream, and if FA1 (510) agrees to relocate the FA functionality based on its own measurement, it sends over PMIP address, Authenticator ID, its own CoA, DHCP context, and other Layer3 information to FA2 (520) in an Anchor HO Request message.

In step 3, target FA2 (520) for FA relocation sends an Anchor Relocate Request message to a PMIP Client (530). This message relays some information about FA2 (520) that is necessary in order to construct and send an MIP RRQ message in step 4. The message contains CoA for FA2 (520), and address of FA2 (520) if the address is different from the CoA. In addition to target FA-CoA, current FA-CoA is also included in the message.

In step 4, PMIP Client (530) verifies that the current FA-CoA indeed matches the FA on its record, and starts the MIP registration with the FA2 (520) by sending an FA Register Request message. This message contains a fully formed RRQ according to RFC3344, with CoA field in the RRQ set to the CoA of FA2 (520), which is received in the Anchor Relocate Request message in step 3. The source address of the RRQ is that of the MS and the destination address of the CoA or the FA, if FA address is different from CoA. In addition, FA Register Request message contains the FA-HA MIP key if this key is used. This message is sent to the FA2 (520), whose address was identified as the source address of the Anchor Relocate Request message in step 3.

In step 5, FA2 (520) relays the RRQ to an HA (540), and in step 6, HA (540) responds with a RRP. In step 7, FA2 (520) relays the MIP RRP encapsulated in an FA Register Response message to PMIP Client (530). PMIP Client (530) updates the FA in its record.

In step 8, FA2 (520) also replies to the FA1 (510) with an Anchor HO Response message, indicating a successful FA relocation. The FA1 (510) may then remove the mobility binding, DHCP context information and the R4 data path towards the FA2 (520).

The present invention may apply to both PMIP and CMIP (client based mobile IP) cases, except the use of current FA-CoA for relocation approval is only applicable in PMIP. The use of current FA-CoA for relocation approval may be a solution for security purpose.

Existing Stage3 states that R3 Relocation Request is sent to a Target FA, so that the Target FA may send Agent Advertisement for CMIP. The present invention applies to CMIP in the same manner: a Source FA may send an Anchor HO Request to a Target FA before FA relocation, if the target FA agrees with the relocation, the target FA may then proceed with relocation procedure, and send Agent Advertisement.

The present invention has many advantages. For example, negotiation is natural for a network based mobility handoff; parameters needed for L3 anchor point relocation are separated from HO messages, and the information may be transferred only during the actual relocation phase; only target FA talking to the PMIP Client matches more closely to the CMIP model in handover; and FA relocation is negotiated before the actual relocation taking place may prevent bad relocation determination algorithm or malicious target in a network to redirect mobile traffic.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for foreign agent relocation of a mobile node in a wireless network comprising a plurality of foreign agents, the method comprising:
    performing relocation negotiation to determine whether foreign agent relocation of the mobile node from a first foreign agent to a second foreign agent in the plurality of foreign agents is agreed, the relocation negotiation being initiated by the second foreign agent;
    performing a foreign agent relocation if the relocation is agreed; and
    refusing to perform the foreign agent relocation if the relocation is rejected.

2. The method of claim 1, further comprising transferring Layer3 context from the first foreign agent to the second foreign agent during the relocation negotiation.

3. The method of claim 2, wherein the Layer3 context comprises Quality of Service (QoS) information, Accounting information, Connectivity Service Network Mobility Management (CSNMM) information, Service Flow (SF) information, or Dynamic Host Configuration Protocol (DHCP) proxy information.

4. The method of claim 1, further comprising performing the relocation negotiation through communication between the first foreign agent and the second foreign agent in the plurality of foreign agents.

5. The method of claim 1, wherein performing relocation negotiation comprises sending a foreign agent relocation request from the first foreign agent to the second foreign agent.

6. The method of claim 5, further comprising sending Layer3 context from the first foreign agent to the second foreign agent if the second foreign agent agrees with the relocation.

7. The method of claim 5, wherein the foreign agent relocation request comprises Layer3 context.

8. The method of claim 1, wherein performing relocation negotiation comprises sending an Anchor handover HO Request message to the second foreign agent from the first foreign agent, the Anchor HO Request message comprising Layer3 context.

9. The method of claim 1, wherein performing relocation negotiation comprises:
    sending a foreign agent relocation trigger from the second foreign agent to the first foreign agent; and
    sending a foreign agent relocation request from the first foreign agent to the second foreign agent if the first foreign agent agrees with the relocation.

10. The method of claim 9, wherein the foreign agent relocation request comprises Layer3 context.

11. The method of claim 1, wherein the wireless network is a WiMAX network.

12. The method of claim 11, wherein the wireless network supports Proxy Mobile IP (PMIP) protocol or Client based Mobile IP (CMIP) protocol.

13. The method of claim 1, wherein performing foreign agent relocation further comprises registering the second foreign agent with a Home Agent (HA) of the mobile node.

14. The method of claim 13, further comprising continuing to provide services to the mobile node by the first foreign agent if the registration fails.

15. A system for foreign agent relocation in a wireless network, comprising:
    at least one first foreign agent;
    at least one second foreign agent; and
    at least one mobile node;
    wherein relocation negotiation is performed to determine whether foreign agent relocation of the mobile node from the at least one first foreign agent to the at least one second foreign agent is agreed, wherein a foreign agent relocation is performed if the foreign agent relocation is agreed, wherein the foreign agent remains as the at least one first foreign agent without relocation if the foreign agent relocation is rejected, and wherein the relocation negotiation is initiated by the at least one second foreign agent.

16. The system of claim 15, wherein Layer3 context is transferred from the at least one first foreign agent to the at least one second foreign agent during the relocation negotiation.

17. The system of claim 16, wherein the layer 3 context comprises Quality of Service (QOS) information, Accounting information, Connectivity Service Network Mobility Management (CSNMM) information, Service Flow (SF) information, or Dynamic Host Configuration Protocol (DHCP) proxy information.

18. The system of claim 15, wherein the relocation negotiation is performed through communication between the at least one first foreign agent and the at least one second foreign agent.

19. The system of claim 15, wherein relocation negotiation is performed using a method comprising sending a foreign agent relocation request from the at least one first foreign agent to the at least one second foreign agent.

20. The system of claim 19, wherein the method further comprising sending Layer3 context from the at least one first foreign agent to the at least one second foreign agent if the at least one second foreign agent agrees with the relocation.

21. The system of claim 19, wherein the foreign agent relocation request comprises Layer3 context.

22. The system of claim 15, wherein the relocation negotiation is performed using a method comprising sending an Anchor handover HO Request message to the at least one second foreign agent from the at least one first foreign agent, the Anchor HO Request message comprising Layer3 context.

23. The system of claim 15, wherein the relocation negotiation is performed using a method comprising:
    sending a foreign agent relocation trigger from the at least one second foreign agent to the at least one first foreign agent; and
    sending a foreign agent relocation request from the at least one first foreign agent to the at least one second foreign agent if the at least one first foreign agent agrees with the relocation.

24. The system of claim 23, wherein the foreign agent relocation request comprises Layer3 context.

25. The system of claim 15, wherein the wireless network is a WiMAX network.

26. The system of claim 25, wherein the wireless network supports Proxy Mobile IP (PMIP) protocol or Client based Mobile IP (CMIP) protocol.

27. The system of claim 15, wherein the foreign agent relocation is performed using a method comprising registering the second foreign agent with a Home Agent (HA) of the mobile node.

28. The system of claim 27, wherein the at least one first foreign agent continues to provide services to the mobile node if the registration fails.

29. A method for foreign agent relocation in a WiMAX network, the method comprising:
   sending a first relocation request for a mobile node comprising layer 3 context from a first foreign agent to a second foreign agent;
   sending a second relocation request from the second foreign agent to a Mobile IP (MIP) client if the second foreign agent agrees to take over the mobile node;
   confirming the second relocation request;
   informing the first foreign agent by the second foreign agent of a successful relocation; and
   removing layer 3 information regarding the mobile node from the first foreign agent.

30. The method according to claim 29, further comprising initiating the first relocation request by sending a relocation trigger from the second foreign agent to the first foreign agent.

31. A method for foreign agent relocation of a mobile node in a wireless network comprising a plurality of foreign agents, the method comprising:
   performing relocation negotiation to determine whether foreign agent relocation of the mobile node from a first foreign agent to a second foreign agent in the plurality of foreign agents is agreed, the relocation negotiation being initiated by the second foreign agent, wherein performing relocation negotiation comprises sending a foreign agent relocation request from the first foreign agent to the second foreign agent;
   performing a foreign agent relocation if the relocation is agreed;
   refusing to perform the foreign agent relocation if the relocation is rejected; and
   transferring Layer3 context from the first foreign agent to the second foreign agent during the relocation negotiation.

32. The method of claim 31, wherein performing relocation negotiation comprises sending an Anchor handover HO Request message to the second foreign agent from the first foreign agent.

33. A system for foreign agent relocation in a wireless network, comprising:
   at least one first foreign agent;
   at least one second foreign agent; and
   at least one mobile node;
   wherein relocation negotiation is performed to determine whether foreign agent relocation of the mobile node from the at least one first foreign agent to the at least one second foreign agent is agreed,
   wherein a foreign agent relocation is performed if the foreign agent relocation is agreed, wherein the foreign agent remains as the at least one first foreign agent without relocation if the foreign agent relocation is rejected, wherein the relocation negotiation is initiated by the at least one second foreign agent,
   wherein Layer3 context is transferred from the at least one first foreign agent to the at least one second foreign agent during the relocation negotiation, and
   wherein relocation negotiation is performed using a method comprising sending a foreign agent relocation request from the at least one first foreign agent to the at least one second foreign agent.

34. The system of claim 33, wherein the relocation negotiation is performed using the method comprising sending an Anchor HO Request message to the at least one second foreign agent from the at least one first foreign agent.

* * * * *